US006642301B2

(12) United States Patent
White et al.

(10) Patent No.: US 6,642,301 B2
(45) Date of Patent: Nov. 4, 2003

(54) PIGMENT DISPERSIONS CONTAINING DISPERSANTS PREPARED BY CONTROLLED RADICAL POLYMERIZATION HAVING HYDROPHILIC AND HYDROPHOBIC SEGMENTS

(75) Inventors: Daniela White, Pittsburgh, PA (US); Simion Coca, Pittsburgh, PA (US); James B. O'Dwyer, Valencia, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 10/217,621

(22) Filed: Aug. 13, 2002

(65) Prior Publication Data

US 2003/0032716 A1 Feb. 13, 2003

Related U.S. Application Data

(63) Continuation of application No. 09/464,946, filed on Dec. 16, 1999, now Pat. No. 6,462,125.

(51) Int. Cl.[7] .................................................. C08J 31/00
(52) U.S. Cl. ........................ 524/560; 523/334; 523/335; 524/558; 524/566
(58) Field of Search ................................ 523/160, 161, 523/400, 407, 423; 524/505, 556, 560, 495

(56) References Cited

U.S. PATENT DOCUMENTS

| | | | |
|---|---|---|---|
| 4,508,880 A | 4/1985 | Webster | 526/190 |
| 4,554,307 A | 11/1985 | Farrar et al. | 524/425 |
| 4,656,226 A | 4/1987 | Hutchins et al. | 525/93 |
| 4,755,563 A | 7/1988 | West | 525/287 |
| 4,812,517 A | 3/1989 | West | 525/94 |
| 5,085,698 A | 2/1992 | Ma et al. | 106/20 |
| 5,219,945 A | 6/1993 | Dicker et al. | 525/276 |
| 5,221,334 A | 6/1993 | Ma et al. | 106/20 D |
| 5,272,201 A | 12/1993 | Ma et al. | 524/505 |
| 5,478,886 A | 12/1995 | Kim | 525/94 |
| 5,714,993 A | 2/1998 | Keoshkerian et al. | 347/95 |
| 5,763,548 A | 6/1998 | Matyjaszewski et al. | 526/135 |
| 5,789,487 A | 8/1998 | Matyjaszewski et al. | 525/301 |
| 5,807,937 A | 9/1998 | Matyjaszewski et al. | 526/135 |
| 5,859,113 A | 1/1999 | McIntyre et al. | 524/460 |
| 6,268,433 B1 * | 7/2001 | Barkac et al. | 525/91 F |
| 6,391,391 B2 * | 5/2002 | Barkac et al. | 427/386 |

FOREIGN PATENT DOCUMENTS

| | | |
|---|---|---|
| WO | WO 96/30421 | 10/1996 |
| WO | WO 97/18247 | 5/1997 |
| WO | WO 98/01480 | 1/1998 |
| WO | WO 98/40415 | 9/1998 |
| WO | WO 00/26308 | 5/2000 |
| WO | WO 00/40630 | 7/2000 |

* cited by examiner

*Primary Examiner*—Edward J. Cain
*Assistant Examiner*—Katarzyna W. Lee
(74) *Attorney, Agent, or Firm*—William J. Uhl

(57) ABSTRACT

A pigment dispersion comprising pigment, an aqueous carrier selected from water and a mixture of water and at least one organic solvent, and a pigment dispersant is described. The pigment dispersant is prepared by controlled radical polymerization, e.g., atom transfer radical polymerization, and has polymer chain structure represented by the following general formula I, $$\phi\text{-}(G)_p\text{-}(E)_s\text{-}T \qquad \text{I}$$

In general formula I, G is a residue of at least one radically polymerizable ethylenically unsaturated monomer; E is a hydrophilic residue of at least one radically polymerizable ethylenically unsaturated monomer; G and E are different from one another; φ is a hydrophobic residue of or derived from the initiator, and is free of said radically transferable group; T is or is derived from the radically transferable group of the initiator; p and s represent average numbers of residues occurring in a block of residues; p and s are each individually selected such that the pigment dispersant has a number average molecular weight of at least 250.

13 Claims, No Drawings

PIGMENT DISPERSIONS CONTAINING DISPERSANTS PREPARED BY CONTROLLED RADICAL POLYMERIZATION HAVING HYDROPHILIC AND HYDROPHOBIC SEGMENTS

This application is a continuation of U.S. patent application Ser. No. 09/464,946, filed Dec. 16, 1999 now U.S. Pat. No. 6,462,125, which is herein incorporated by reference.

FIELD OF THE INVENTION

The present invention relates to pigment dispersions containing pigment, an aqueous carrier, and a pigment dispersant. The pigment dispersant is prepared by controlled radical polymerization and has well defined polymer chain architecture, molecular weight, and distinct hydrophobic and hydrophilic polymer chain segments.

BACKGROUND OF THE INVENTION

Pigmented coating compositions are used in a wide variety of applications including, for example, corrosion resistant primers and decorative topcoats in the automotive, industrial and appliance markets. The preparation of pigmented coating compositions generally involves mixing binder resin(s), crosslinker(s), additives, e.g., flow additives, and solvents with a compatible pigment dispersion. Pigment dispersions are typically prepared by mixing dry pigment with a pigment dispersant in the presence of a carrier medium, e.g., an aqueous carrier medium.

Dry pigments are available commercially in the form of agglomerated pigment particles. Pigment agglomerates are more likely to settle out of pigment dispersions and/or pigmented coating compositions, and are accordingly undesirable. To break the pigment agglomerates down into smaller agglomerates and/or individual particles generally requires the use of energy intensive mixing means (commonly referred to as grinding), e.g., sand mills and ball mills. During the grinding process the pigment agglomerates are broken down into smaller agglomerates and/or individual particles the surfaces of which are wetted by the pigment dispersant. The pigment dispersant suspends or disperses the pigment particles in the carrier medium and prevents their re-agglomeration on storage. It is desirable that the pigment dispersion remain substantially stable, e.g., showing minimal pigment settling and viscosity change with time, prior to its use in the preparation of a pigmented coating composition.

Reducing the environmental impact of pigmented coatings compositions, in particular that associated with emissions into the air of volatile organics during their use, has been an area of ongoing investigation and development in recent years. Accordingly, interest in aqueous pigment dispersions has been increasing due, in part, to the inherently low volatile organic content (VOC) of the aqueous pigmented coatings prepared therefrom, which can significantly reduce air emissions during the application process.

Pigment dispersants used in aqueous pigment dispersions are preferably compatible with both the aqueous carrier medium and the hydrophobic surfaces of the pigment particles. Such a combination of disparate properties can be achieved with a pigment dispersant having distinct hydrophobic and hydrophilic polymeric segments or portions, i.e., having well defined polymer chain architecture. A wide variety of radically polymerizable monomers, such as methacrylate and acrylate monomers, are commercially available and can provide a wide range of properties including, for example, hydrophilic and hydrophobic properties. The use of conventional, i.e., non-living or free, radical polymerization methods to synthesize pigment dispersants provides little control over molecular weight, molecular weight distribution and, in particular, polymer chain structure. Aqueous pigment dispersions containing pigment dispersants prepared by conventional non-living radical polymerizations, typically have poor stability, e.g., the pigments re-agglomerate and/or settle out of the dispersion, and are unsuitable for the preparation of aqueous pigmented coatings compositions.

The continued development of aqueous pigment dispersions that are stable and suitable for the preparation of aqueous pigmented coating compositions is desirable. In particular, it would be desirable to develop aqueous pigment dispersions that comprise pigment dispersants having well defined polymer chain architecture in which distinct hydrophilic and hydrophobic polymer segments or portions are present.

U.S. Pat. Nos. 5,807,937, 5,789,487 and 5,763,548, and International Patent Publication Nos. WO 98/40415, WO 98/01480, WO 97/18247 and WO 96/30421 describe a radical polymerization process referred to as atom transfer radical polymerization (ATRP). The ATRP process is described as being a living radical polymerization that results in the formation of (co)polymers having predictable molecular weight and molecular weight distribution. The ATRP process is also described as providing highly uniform products having controlled structure (i.e., controllable topology, composition, etc.). The '937 and '548 patents also describe (co)polymers prepared by ATRP, which are useful in a wide variety of applications including, for example, dispersants and surfactants.

U.S. Pat. Nos. 5,478,886, 5,272,201, 5,221,334, 5,219,945, 5,085,698, 4,812,517, and 4,755,563 describe ABC, AB and BAB block copolymers and pigmented ink compositions containing such block copolymers. The block copolymers of the '886, '201, '334, '945, '698, '517 and '563 patents are described as being prepared by living or stepwise polymerization processes, such as anionic or group transfer polymerization.

SUMMARY OF THE INVENTION

In accordance with the present invention, there is provided a pigment dispersion comprising:

(a) pigment;

(b) an aqueous carrier selected from water and a mixture of water and at least one organic solvent; and (c) a pigment dispersant prepared by controlled radical polymerization initiated in the presence of a monomeric initiator having a single radically transferable group, and in which the pigment dispersant has a polymer chain structure represented by the following general formula I, $$\phi\text{-}(G)_p\text{-}(E)_s\text{-}T \qquad \qquad I$$

wherein G is a residue of at least one radically polymerizable ethylenically unsaturated monomer; E is a hydrophilic residue of at least one radically polymerizable ethylenically unsaturated monomer; G and E being different from one another; $\phi$ is a hydrophobic residue of or derived from said initiator, and is free of said radically transferable group; T is or is derived from said radically transferable group of said initiator; p and s represent average numbers of residues occurring in a block of residues; p and s are each individually selected such that said pigment dispersant has a number average molecular weight of at least 250.

Other than in the operating examples, or where otherwise indicated, all numbers or expressions referring to quantities of ingredients, reaction conditions, etc., used in the specification and claims are to be understood as modified in all instances by the term "about."

DETAILED DESCRIPTION OF THE INVENTION

Pigment dispersions according to the present invention comprise a pigment dispersant, which is prepared by controlled radical polymerization, and has distinct hydrophobic and hydrophilic segments or portions. The hydrophobic segment of the pigment dispersant comprises the hydrophobic residue of the monomeric initiator, as represented by the symbol $\phi$- in general formula I, or the combination of the initiator residue and monomer residue G, i.e., as represented by the $\phi$-$(G)_p$-segment in general formula I. The hydrophilic segment of the pigment dispersant comprises the hydrophilic monomer residue E, i.e., as represented by the -$(E)_s$-segment in general formula I. While not intending to be bound by any theory, it is believed that the hydrophilic segment of the pigment dispersant is associated with the aqueous carrier, while the hydrophobic segment is associated with the pigment of the pigment dispersion.

As used herein and in the claims, the terms "hydrophobic" and "hydrophilic" are relative to each other. The hydrophobic segment of the pigment dispersant is more hydrophobic than the hydrophilic segment. Correspondingly, the hydrophilic segment of the pigment dispersant is more hydrophilic than the hydrophobic segment.

A more quantitative measure of the hydrophobic or hydrophilic nature of a nonionic monomer residue can be obtained by using the following Formula-A: 100×(oxygen weight+ nitrogen weight)/(carbon weight). Monomer residues having calculated Formula-A values of greater magnitude are generally considered to be more hydrophilic than monomer residues having calculated Formula-A values of lesser magnitude. For example, the calculated Formula-A value is 67 for 2-hydroxyethyl methacrylate; 63 for methacrylamide; 53 for methyl methacrylate; 33 for butyl methacrylate; and 22 for 2-ethylhexyl methacrylate. Accordingly, an average Formula-A value can be calculated for a polymer chain segment or portion by averaging the calculated Formula-A values for the monomer residues within that segment.

In an embodiment of the present invention, and with reference to general formula I, the hydrophilic polymer chain segment -$(E)_s$- of the pigment dispersant has a calculated average Formula-A value of from 55 to 133, while the -$(G)_p$-segment is a hydrophobic polymer chain segment having a calculated average Formula-A value of from 10 to less than 55, e.g., from 10 to 40 or from 10 to 33. The difference between the calculated Formula-A values of the hydrophilic polymer chain segment and the hydrophobic polymer chain segment of the pigment dispersant is typically at least 10, e.g., at least 25, and typically within the range of 10 to 40, inclusive of the recited values.

The hydrophobic polymer chain segment of the pigment dispersant typically does not contain ionic monomer residues. The hydrophilic polymer chain segment of the pigment dispersant may contain ionic monomer residues, nonionic monomer residues (e.g., having calculated Formula-A values of from 55 to 133) or a combination of ionic and nonionic monomer residues.

The pigment dispersant is prepared by controlled radical polymerization. As used herein and in the claims, the term "controlled radical polymerization," and related terms, e.g., "living radical polymerization," refer to those methods of radical polymerization that provide control over the molecular weight, polymer chain architecture and polydispersity of the resulting polymer. A controlled or living radical polymerization is also described as a chain-growth polymerization that propagates with essentially no chain transfer and essentially no chain termination. The number of living polymer chains formed during a controlled radical polymerization is often nearly equal to the number of initiators present at the beginning of the reaction. Each living polymer chain typically contains a residue of the initiator at what is commonly referred to as its tail, and a residue of the radically transferable group at what is commonly referred to as its head.

In an embodiment of the present invention, the pigment dispersant is prepared by atom transfer radical polymerization (ATRP). The ATRP process can be described generally as comprising: polymerizing one or more radically polymerizable monomers in the presence of an initiation system; forming a polymer; and isolating the formed polymer. In the present invention, the initiation system comprises: a monomeric initiator having a single radically transferable atom or group; a transition metal compound, i.e., a catalyst, which participates in a reversible redox cycle with the initiator; and a ligand, which coordinates with the transition metal compound. The ATRP process is described in further detail in international patent publication WO 98/40415 and U.S. Pat. Nos. 5,807,937, 5,763,548 and 5,789,487.

Catalysts that may be used in the ATRP preparation of the pigment dispersant, include any transition metal compound that can participate in a redox cycle with the initiator and the growing polymer chain. It is preferred that the transition metal compound not form direct carbon-metal bonds with the polymer chain. Transition metal catalysts useful in the present invention may be represented by the following general formula II, $$TM^{n+}X_n \qquad \qquad II$$

wherein TM is the transition metal, n is the formal charge on the transition metal having a value of from 0 to 7, and X is a counterion or covalently bonded component. Examples of the transition metal (TM) include, but are not limited to, Cu, Fe, Au, Ag, Hg, Pd, Pt, Co, Mn, Ru, Mo, Nb and Zn. Examples of X include, but are not limited to, halide, hydroxy, oxygen, $C_1$–$C_6$-alkoxy, cyano, cyanato, thiocyanato and azido. A preferred transition metal is Cu(I) and X is preferably halide, e.g., chloride. Accordingly, a preferred class of transition metal catalysts are the copper halides, e.g., Cu(I)Cl. It is also preferred that the transition metal catalyst contain a small amount, e.g., 1 mole percent, of a redox conjugate, for example, Cu(II)$Cl_2$ when Cu(I)Cl is used. Additional catalysts useful in preparing the pigment dispersant are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in the ATRP preparation of the pigment dispersant, include, but are not limited to compounds having one or more nitrogen, oxygen, phosphorus and/or sulfur atoms, which can coordinate to the transition metal catalyst compound, e.g., through sigma and/or pi bonds. Classes of useful ligands, include but are, not limited to: unsubstituted and substituted pyridines and bipyridines;

porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl (meth)acrylates. As used herein and in the claims, the term "(meth)acrylate" and similar terms refer to acrylates, methacrylates, and mixtures of acrylates and methacrylates. A preferred class of ligands are the substituted bipyridines, e.g., 4,4'-dialkyl-bipyridyls. Additional ligands that may be used in preparing pigment dispersant are described in U.S. Pat. No. 5,807,937 at column 18, line 57 through column 21, line 43.

Classes of monomeric initiators that may be used in the ATRP preparation of the pigment dispersant include, but are not limited to aliphatic compounds, cycloaliphatic compounds, aromatic compounds, polycyclic aromatic compounds, heterocyclic compounds, sulfonyl compounds, sulfenyl compounds, esters of carboxylic acids, nitriles, ketones, phosphonates and mixtures thereof, each having a radically transferable group, and preferably a single radically transferable group. The radically transferable group of the monomeric initiator may be selected from, for example, cyano, cyanato, thiocyanato, azido and halide groups. Preferably, the radically transferable group of the monomeric initiator is a halide. The monomeric initiator may also be substituted with functional groups, e.g., oxyranyl groups, such as glycidyl groups. Additional useful initiators are described in U.S. Pat. No. 5,807,937 at column 17, line 4 through column 18, line 28.

In an embodiment of the present invention, the monomeric initiator is selected from 1-halo-2,3-epoxypropane, p-toluenesulfonyl halide, p-toluenesulfenyl halide, $C_6$–$C_{20}$-alkyl ester of alpha-halo-$C_2$–$C_6$-carboxylic acid, halomethylbenzene, (1-haloethyl)benzene, halomethylnaphthalene, halomethylanthracene and mixtures thereof. Examples of $C_6$–$C_{20}$-alkyl ester of alpha-halo-$C_2$–$C_6$-carboxylic acids include, hexyl alpha-bromopropionate, 2-ethylhexyl alpha-bromopropionate, 2-ethylhexyl alpha-bromohexionate and icosanyl alpha-bromopropionate. As used herein and in the claims, the term "monomeric initiator" is meant to be distinguishable from polymeric initiators, such as polyethers, polyurethanes, polyesters and acrylic polymers having radically transferable groups.

In the ATRP preparation the pigment dispersant, the amounts and relative proportions of monomeric initiator, transition metal compound and ligand are those for which ATRP is most effectively performed. The amount of initiator used can vary widely and is typically present in the reaction medium in a concentration of from $10^{-4}$ moles/liter (M) to 3 M, for example, from $10^{-3}$ M to $10^{-1}$ M. As the molecular weight of the pigment dispersant can be directly related to the relative concentrations of initiator and monomer(s), the molar ratio of initiator to monomer is an important factor in polymer preparation. The molar ratio of initiator to monomer is typically within the range of $10^{-4}$:1 to 0.5:1, for example, $10^{-3}$:1 to $5\times10^{-2}$:1.

In preparing the pigment dispersant by ATRP methods, the molar ratio of transition metal compound to initiator is typically in the range of $10^{-4}$:1 to 10:1, for example, 0.1:1 to 5:1. The molar ratio of ligand to transition metal compound is typically within the range of 0.1:1 to 100:1, for example, 0.2:1 to 10:1.

The pigment dispersant may be prepared in the absence of solvent, i.e., by means of a bulk polymerization process. Generally, the pigment dispersant is prepared in the presence of a solvent, typically water and/or an organic solvent.

Classes of useful organic solvents include, but are not limited to, esters of carboxylic acids, ethers, cyclic ethers, $C_5$–$C_{10}$ alkanes, $C_5$–$C_8$ cycloalkanes, aromatic hydrocarbon solvents, halogenated hydrocarbon solvents, amides, nitriles, sulfoxides, sulfones and mixtures thereof. Supercritical solvents, such as $CO_2$, $C_1$–$C_4$ alkanes and fluorocarbons, may also be employed. A preferred class of solvents are the aromatic hydrocarbon solvents, particularly preferred examples of which are xylene, toluene, and mixed aromatic solvents such as those commercially available from Exxon Chemical America under the trademark SOLVESSO. Additional solvents are described in further detail in U.S. Pat. No. 5,807,937 at column 21, line 44 through column 22, line 54.

The ATRP preparation of the pigment dispersant is typically conducted at a reaction temperature within the range of 25° C. to 140° C., e.g., from 50° C. to 100° C., and a pressure within the range of 1 to 100 atmospheres, usually at ambient pressure. The atom transfer radical polymerization is typically completed in less than 24 hours, e.g., between 1 and 8 hours.

The ATRP transition metal catalyst and its associated ligand are typically separated or removed from the pigment dispersant prior to its use in the pigment dispersants of the present invention. Removal of the ATRP catalyst may be achieved using known methods, including, for example, adding a catalyst binding agent to the a mixture of the pigment dispersant, solvent and catalyst, followed by filtering. Examples of suitable catalyst binding agents include, for example, alumina, silica, clay or a combination thereof. A mixture of the pigment dispersant, solvent and ATRP catalyst may be passed through a bed of catalyst binding agent. Alternatively, the ATRP catalyst may be oxidized in situ, the oxidized residue of the catalyst being retained in the pigment dispersant.

With reference to general formula I, G and E may each be residues of monomers independently selected from vinyl monomers, allylic monomers, olefins and mixtures thereof. Classes of vinyl monomers of which G and E may each independently be residues of and that may be used to prepare the pigment dispersant, include, but are not limited to, (meth)acrylic acid, (meth)acrylates, (meth)acrylamide, N- and N,N-disubstituted (meth)acrylamides, vinyl aromatic monomers, vinyl halides and vinyl esters of carboxylic acids.

Examples of $C_1$–$C_{20}$ alkyl (meth)acrylates (including linear or branched alkyls and cycloalkyls) of which G and E may each independently be residues of, include, but are not limited to, methyl (meth)acrylate, ethyl (meth)acrylate, propyl (meth)acrylate, isopropyl (meth)acrylate, n-butyl (meth)acrylate, iso-butyl (meth)acrylate, tert-butyl (meth)acrylate, 2-ethylhexyl (meth)acrylate, lauryl (meth)acrylate, isobornyl (meth)acrylate, cyclohexyl (meth)acrylate, 3,3,5-trimethylcyclohexyl (meth)acrylate and isocane (meth)acrylate. Examples of oxirane functional (meth)acrylates of which G and E may each independently be residues of include, but are not limited to, glycidyl (meth)acrylate, 3,4-epoxycyclohexylmethyl(meth)acrylate, and 2-(3,4-epoxycyclohexyl)ethyl(meth)acrylate.

Hydroxy alkyl (meth)acrylates having from 2 to 4 carbon atoms in the alkyl group of which G and E may each independently be residues of include, but are not limited to, hydroxyethyl (meth)acrylate, hydroxypropyl (meth)acrylate and hydroxybutyl (meth)acrylate. In general formula I, G and E may each independently be residues of monomers having more than one (meth)acryloyl group, such as (meth)acrylic anhydride, diethyleneglycol bis(meth)acrylate, 4,4'- isopropylidenediphenol bis(meth)acrylate (Bisphenol A di(meth)acrylate), alkoxylated 4,4'-isopropylidenediphenol bis(meth)acrylate, trimethylolpropane tris(meth)acrylate and alkoxylated trimethylolpropane tris(meth)acrylate.

Specific examples of vinyl aromatic monomers that may be used to prepare the pigment dispersant include, but are not limited to, styrene, p-chloromethylstyrene, divinyl benzene, vinyl naphthalene and divinyl naphthalene. Vinyl halides that may be used to prepare the pigment dispersant include, but are not limited to, vinyl chloride and vinylidene fluoride. Vinyl esters of carboxylic acids that may be used to prepare the pigment dispersant include, but,are not limited to, vinyl acetate, vinyl butyrate, vinyl 3,4-dimethoxybenzoate and vinyl benzoate.

As used herein and in the claims, by "olefin" and like terms is meant unsaturated aliphatic hydrocarbons having one or more double bonds, such as obtained by cracking petroleum fractions. Specific examples of olefins that may be used to prepare the pigment dispersant include, but are not limited to, propylene, 1-butene, 1,3-butadiene, isobutylene and diisobutylene.

As used herein and in the claims, by "allylic monomer(s)" is meant monomers containing substituted and/or unsubstituted allylic functionality, i.e., one or more radicals represented by the following general formula III,

$$H_2C=C(R_1)-CH_2-$$ III wherein $R_1$ is hydrogen, halogen or a $C_1$ to $C_4$ alkyl group. Most commonly, $R_1$ is hydrogen or methyl and consequently general formula III represents the (meth)allyl radical (i.e., the methallyl or allyl radical). Examples of allylic monomers of which G and E may each independently be residues of include, but are not limited to: (meth)allyl ethers, such as methyl (meth)allyl ether and (meth)allyl glycidyl ether; allyl esters of carboxylic acids, such as (meth)allyl acetate, (meth)allyl butyrate, (meth)allyl 3,4-dimethoxybenzoate and (meth)allyl benzoate.

Other ethylenically unsaturated radically polymerizable monomers that may be used to prepare the pigment dispersant include, but are not limited to: cyclic anhydrides, e.g., maleic anhydride, 1-cyclopentene-1,2-dicarboxylic anhydride and itaconic anhydride; esters of acids that are unsaturated but do not have α,β-ethylenic unsaturation, e.g., methyl ester of undecylenic acid; diesters of ethylenically unsaturated dibasic acids, e.g., di($C_1$–$C_4$ alkyl)ethyl maleates; maleimide and N-substituted maleimides.

In an embodiment of the present invention, G is a hydrophobic residue of a monomer selected from oxirane functional monomer reacted with a carboxylic acid selected from the group consisting of aromatic carboxylic acids, polycyclic aromatic carboxylic acids, aliphatic carboxylic acids having from 6 to 20 carbon atoms and mixtures thereof; $C_6$–$C_{20}$ alkyl (meth)acrylates, e.g., including those as previously recited herein; aromatic (meth)acrylates, e.g., phenyl (meth)acrylate, p-nitrophenyl (meth)acrylate and benzyl (meth)acrylate; polycyclicaromatic (meth)acrylates, e.g., 2-naphthyl (meth)acrylate; vinyl esters of carboxylic acids, e.g., hexanoic acid vinyl ester and decanoic acid vinyl ester; N,N-di($C_1$–$C_8$ alkyl) (meth)acrylamides; maleimide; N-($C_1$–$C_{20}$ alkyl) maleimides; N-($C_3$–$C_8$ cycloalkyl) maleimides; N-(aryl) maleimides; and mixtures thereof. Examples of N-substituted maleimides include, but are not limited to, N-($C_1$–$C_{20}$ linear or branched alkyl) maleimides, e.g., N-methyl maleimide, N-tertiary-butyl maleimide, N-octyl maleimide and N-icosane maleimide; N-($C_3$–$C_8$ cycloalkyl) maleimides, e.g., N-cyclohexyl maleimide; and N-(aryl) maleimides, e.g., N-phenyl maleimide, N-($C_1$–$C_9$ linear or branched alkyl substituted phenyl) maleimide, N-benzyl maleimide and N-($C_1$–$C_9$ linear or branched alkyl substituted benzyl) maleimide.

The oxirane functional monomer or its residue that is reacted with a carboxylic acid, and of which G may be a residue, may be selected from, for example, glycidyl (meth)acrylate, 3,4-epoxycyclohexylmethyl(meth)acrylate, 2-(3,4-epoxycyclohexyl)ethyl(meth)acrylate, allyl glycidyl ether and mixtures thereof. Examples of carboxylic acids that may be reacted with the oxirane functional monomer or its residue include, but are not limited to, para-nitrobenzoic acid, hexanoic acid, 2-ethyl hexanoic acid, decanoic acid, undecanoic acid and mixtures thereof.

In another embodiment of the present invention, the -(G)$_p$- segment of the pigment dispersant serves as a linking segment between the hydrophobic residue of the initiator, i.e., φ- in general formula I, and the hydrophilic portion of the pigment dispersant, i.e., the -(E)$_s$- segment in general formula I. In general formula I, G may be a residue of $C_1$–$C_4$ alkyl (meth)acrylates. Examples of $C_1$–$C_4$ alkyl (meth) acrylates of which G may be a residue include, methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate and mixtures thereof.

With reference to general formula I, E may have nonionic moieties, ionic moieties and combinations thereof. In an embodiment of the present invention, E is a residue of a monomer selected from, for example, poly(alkylene glycol) (meth)acrylates; $C_1$–$C_4$ alkoxy poly(alkylene glycol) (meth) acrylates; hydroxyalkyl (meth)acrylates having from 2 to 4 carbon atoms in the alkyl group; N-(hydroxy $C_1$–$C_4$ alkyl) (meth)acrylamides (e.g., N-hydroxymethyl (meth) acrylamide and N-(2-hydroxyethyl) (meth)acrylamide); N,N-di-(hydroxy $C_1$–$C_4$ alkyl) (meth)acrylamides (e.g., N,N-di(2-hydroxyethyl) (meth)acrylamide); carboxylic acid functional monomers; salts of carboxylic acid functional monomers; amine functional monomers; salts of amine functional monomers; and mixtures thereof.

Poly(alkylene glycol) (meth)acrylates and $C_1$–$C_4$ alkoxy poly(alkylene glycol) (meth)acrylates of which E may be a residue are prepared by known methods. For example, (meth)acrylic acid or hydroxyalkyl (meth)acrylate, e.g., 2-hydroxyethyl (meth)acrylate, may be reacted with one or more alkylene oxides, e.g., ethylene oxide, propylene oxide and butylene oxide. Alternatively, an alkyl (meth)acrylate may be transesterified with a $C_1$–$C_4$ alkoxy poly(alkylene glycol), e.g., methoxy poly(ethylene glycol). Examples of preferred poly(alkylene glycol) (meth)acrylates and $C_1$–$C_4$ alkoxy poly(alkylene glycol) (meth)acrylates include, poly (ethylene glycol) (meth)acrylate and methoxy poly(ethylene glycol) (meth)acrylate, the poly(ethylene glycol) moiety of each having a molecular weight of from 100 to 800. An example of a commercially available $C_1$–$C_4$ alkoxy poly (alkylene glycol) (meth)acrylate is methoxy poly(ethylene glycol) 550 methacrylate monomer from Sartomer Company, Inc.

Examples of carboxylic acid functional monomers of which E may be a residue include, but are not limited to, (meth)acrylic acid, maleic acid, fumeric acid and undecylenic acid. In general formula I, E may initially be a residue of a precursor of a carboxylic acid functional monomer that is converted to a carboxylic acid residue after completion of the controlled radical polymerization, e.g., maleic anhydride, di($C_1$–$C_4$ alkyl) maleates and $C_1$–$C_4$ alkyl (meth)acrylates. For example, residues of maleic anhydride can be converted to diacid residues, ester/acid residues or amide/acid residues by art-recognized reactions with water, alcohols or primary amines, respectively. Residues of $C_1$–$C_4$ alkyl (meth)acrylates, such as t-butyl methacrylate, can be converted to (meth)acrylic acid residues by art-recognized ester hydrolyzation methods, which typically involve the concurrent removal of an alcohol, such as t-butanol by vacuum distillation. Salts of carboxylic acid functional monomers of which E may be a residue include, for example, salts of (meth)acrylic acid and primary, secondary or tertiary amines, such as, butyl amine, dimethyl amine and triethyl amine.

Amine functional monomers of which E may be a residue include, for example, amino($C_2$–$C_4$ alkyl) (meth)acrylates, e.g., 2-aminoethyl (meth)acrylate, 3-aminopropyl (meth)acrylate and 4-aminobutyl (meth)acrylate; N-($C_1$–$C_4$ alkyl) amino($C_2$–$C_4$ alkyl) (meth)acrylates, e.g., N-methyl-2-aminoethyl (meth)acrylate; and N,N-di($C_1$–$C_4$ alkyl)amino ($C_2$–$C_4$ alkyl) (meth)acrylates, e.g., N,N-dimethyl-2-aminoethyl (meth)acrylate. Residue E of general formula I may also comprise residues of salts of amine functional monomers, e.g., salts of those amine functional monomers as recited previously herein. Salts of the amine functional monomer residues may be formed by mixing a carboxylic acid, e.g., lactic acid, with the pigment dispersant after completion of controlled radical polymerization.

In an embodiment of the present invention, E is a residue of carboxylic acid functional monomers selected from (meth)acrylic acid, maleic anhydride, maleic acid, di($C_1$–$C_4$ alkyl) maleates, and mixtures thereof. In a still further embodiment of the present invention, E is a residue of amine functional monomers selected from amino($C_2$–$C_4$ alkyl) (meth)acrylates, N-($C_1$–$C_4$ alkyl)amino($C_2$–$C_4$ alkyl) (meth)acrylates, N,N-di($C_1$–$C_4$ alkyl)amino($C_2$–$C_4$ alkyl) (meth)acrylates and mixtures thereof.

Residue E of general formula I may also contain cationic moieties selected from ammonium, sulphonium and phosphonium. Ammonium, sulphonium and phosphonium moieties may be introduced into the pigment dispersant by means known to the skilled artisan. For example, when E is a residue of N,N -dimethyl-2-aminoethyl (meth)acrylate, the N,N-dimethylamino moieties may be converted to ammonium moieties by mixing an acid, e.g., lactic acid, with the pigment dispersant.

When the -(E)$_s$- segment of the pigment dispersant contains residues of oxirane functional monomers, such as glycidyl (meth)acrylate, the oxirane groups may be used to introduce sulphonium or phosphonium moieties into the pigment dispersant. Sulphonium moieties may be introduced into the pigment dispersant by reaction of the oxirane groups with thiodiethanol in the presence of an acid, such as lactic acid. Reaction of the oxirane groups with a phosphine, e.g., triphenyl phosphine or tributyl phosphine, in the presence of an acid, such as lactic acid, results in the introduction of phosphonium moieties into the pigment dispersant.

Each of G and E in general formula I may represent one or more types of monomer residues, while p and s represent the average total number of G and E residues occurring per block or segment of G residues (G-block or G-segment) and E residues (E-block or E-segment) respectively. When containing more than one type or species of monomer residue, the G- and E-blocks may each have at least one of random, block (e.g., di-block and tri-block), alternating and gradient architectures. Gradient architecture refers to a sequence of different monomer residues that changes gradually in a systematic and predictable manner along the polymer backbone. For purposes of illustration, a G-block containing 6 residues of methyl methacrylate (MMA) and 6 residues of ethyl methacrylate (EMA), for which p is 12, may have di-block, tetra-block, alternating and gradient architectures as represented in general formulas IV, V, VI and VII.

Di-Block Architecture

-(MMA-MMA-MMA-MMA-MMA-MMA-EMA-EMA-EMA-EMA-EMA-EMA)-  IV

Tetra-Block Architecture

-(MMA-MMA-MMA-EMA-EMA-EMA-MMA-MMA-MMA-EMA-EMA-EMA)-  V

Alternating Architecture

-(MMA-EMA-MMA-EMA-MMA-EMA-MMA-EMA-MMA-EMA-MMA-EMA)-  VI

Gradient Architecture

-(MMA-MMA-MMA-EMA-MMA-MMA-EMA-EMA-MMA-EMA-EMA-EMA)-tm VII

The E-block may be described in a manner similar to that of the G-block.

The order in which monomer residues occur along the polymer backbone of the pigment dispersant is typically determined by the order in which the corresponding monomers are fed into the vessel in which the controlled radical polymerization is conducted. For example, the monomers that are incorporated as residues in the G-block of the pigment dispersant are generally fed into the reaction vessel prior to those monomers that are incorporated as residues in the E-block.

During formation of the G- and E-blocks, if more than one monomer is fed into the reaction vessel at a time, the relative reactivities of the monomers typically determines the order in which they are incorporated into the living polymer chain. Gradient sequences of monomer residues within the G-and E-blocks can be prepared by controlled radical polymerization, and in particular by ATRP methods by (a) varying the ratio of monomers fed to the reaction medium during the course of the polymerization, (b) using a monomer feed containing monomers having different rates of polymerization, or (c) a combination of (a) and (b). Copolymers containing gradient architecture are described in further detail in U.S. Pat. No. 5,807,937 at column 29, line 29 through column 31, line 35.

Subscripts p and s represent average numbers of residues occurring in the respective G and E blocks. Typically, subscript s has a value of at least 1, and preferably at least 5 for general formula I. Also, subscript s has a value of typically less than 300, preferably less than 100, and more preferably less than 50 (e.g., 20 or less) for general formula I. The value of subscript s may range between any combination of these values, inclusive of the recited values, e.g., s may be a number from 1 to 100. Subscript p may be 0, or may have a value of at least 1, and preferably at least 5. Subscript p also typically has a value of less than 300, preferably less than 100, and more preferably less than 50 (e.g., 20 or less). The value of subscript p may range between any combination of these values, inclusive of the recited values, e.g., p may be a number from 0 to 50.

The pigment dispersant typically has a number average molecular weight (Mn) of from 250 to 40,000, e.g., from 1000 to 30,000 or from 3000 to 20,000, as determined by gel permeation chromatography using polystyrene standards. The polymer dispersity index (i.e., weight average molecular weight (Mw) divided by Mn) of the pigment dispersant is typically less than 2.0, e.g., less than 1.8 or less than 1.5.

Symbol φ of general formula I is or is derived from the residue of the initiator used in the preparation of the pigment dispersant by controlled radical polymerization, and is free of the radically transferable group of the initiator. For example, when the pigment dispersant is initiated in the presence of benzyl bromide, the symbol φ, more specifically φ-

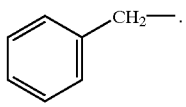

is the benzyl residue,

The symbol φ may also represent a derivative of the residue of the initiator. For example, when the pigment dispersant is prepared with initiators having oxyranyl groups, the oxyranyl groups may be reacted either prior to or after the completion of the controlled radical polymerization with a carboxylic acid. Classes of carboxylic acids with which oxyranyl functional initiators or their residues may be reacted include, for example, aromatic carboxylic acids, polycyclic aromatic carboxylic acids, aliphatic carboxylic acids having from 6 to 20 carbon atoms and mixtures thereof. Specific examples of carboxylic acids with which oxyranyl functional initiators or their residues may be reacted include, but are not limited to, para-nitrobenzoic acid, hexanoic acid, 2-ethyl hexanoic acid, decanoic acid, undecanoic acid and mixtures thereof.

For purposes of illustration, when the controlled radical polymerization is performed in the presence of an oxyranyl functional initiator, such as epichlorohydrin, the symbol φ, more specifically φ-, is the 2,3-epoxy-propyl residue,

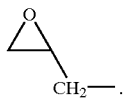

The 2,3-epoxy-propyl residue can then be converted to, for example, a 3-(para-nitrobenzoate)-2-hydroxypropyl residue by reaction with para-nitrobenzoic acid.

In general formula I, T is or is derived from the radically transferable group of the ATRP initiator. The residue of the radically transferable group may be (a) left on the pigment dispersant, (b) removed or (c) chemically converted to another moiety. The radically transferable group may be removed by substitution with a nucleophilic compound, e.g., an alkali metal alkoxylate. When the residue of the radically transferable group is, for example, a cyano group (—CN), it can be converted to an amide group or carboxylic acid group by methods known in the art.

In a preferred embodiment of the present invention, the radically transferable group is a halide, which can be removed from the pigment dispersant by means of a mild dehalogenation reaction. The reaction is typically performed as a post-reaction after the pigment dispersant has been formed, and in the presence of at least an ATRP catalyst. Preferably, the dehalogenation post-reaction is performed in the presence of both an ATRP catalyst and its associated ligand.

The mild dehalogenation reaction is performed by contacting the halogen containing pigment dispersant with one or more ethylenically unsaturated compounds, which are not readily radically polymerizable under at least a portion of the spectrum of conditions under which atom transfer radical polymerizations are performed, hereinafter referred to as "limited radically polymerizable ethylenically unsaturated compounds" (LRPEU compound).

Not intending to be bound by any theory, it is believed, based on the evidence at hand, that the reaction between the halogen containing pigment dispersant and one or more LRPEU compounds results in (1) removal of the halogen group, and (2) the addition of at least one carbon-carbon double bond where the carbon-halogen bond is broken. The dehalogenation reaction is typically conducted at a temperature in the range of 0° C. to 200° C., e.g., from 0° C. to 160° C., a pressure in the range of 0.1 to 100 atmospheres, e.g., from 0.1 to 50 atmospheres. The reaction is also typically performed in less than 24 hours, e.g., between 1 and 8 hours. While the LRPEU compound may be added in less than a stoichiometric amount, it is preferably added in at least a stoichiometric amount relative to the moles of halogen present in the pigment dispersant. When added in excess of a stoichiometric amount, the LRPEU compound is typically present in an amount of no greater than 5 mole percent, e.g., 1 to 3 mole percent, in excess of the total moles of halogen.

Limited radically polymerizable ethylenically unsaturated compounds useful for dehalogenating the pigment dispersant under mild conditions include those represented by the following general formula VIII.

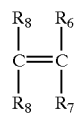

VIII

In general formula VIII, $R_6$ and $R_7$ can be the same or different organic groups such as: alkyl groups having from 1 to 4 carbon atoms; aryl groups; alkoxy groups; ester groups; alkyl sulfur groups; acyloxy groups; and nitrogen-containing alkyl groups where at least one of the $R_6$ and $R_7$ groups is an organo group while the other can be an organo group or hydrogen. For instance when one of $R_6$ or $R_7$ is an alkyl group, the other can be an alkyl, aryl, acyloxy, alkoxy, arenes, sulfur-containing alkyl group, or nitrogen-containing alkyl and/or nitrogen-containing aryl groups. The $R_8$ groups can be the same or different groups selected from hydrogen or lower alkyl selected such that the reaction between the terminal halogen of the pigment dispersant and the LRPEU compound is not prevented. Also an $R_8$ group can be joined to the $R_6$ and/or the $R_7$ groups to form a cyclic compound.

It is preferred that the LRPEU compound be free of halogen groups. Examples of suitable LRPEU compounds include, but are not limited to, 1,1-dimethylethylene, 1,1-diphenylethylene, isopropenyl acetate, alpha-methyl styrene, 1,1-dialkoxy olefin and mixtures thereof. Additional examples include dimethyl itaconate and diisobutene (2,4,4-trimethyl-1-pentene).

For purposes of illustration, the reaction between the halogen containing pigment dispersant and an LRPEU compound, e.g., alpha-methyl styrene, is summarized in the following general scheme 1.

General Scheme 1

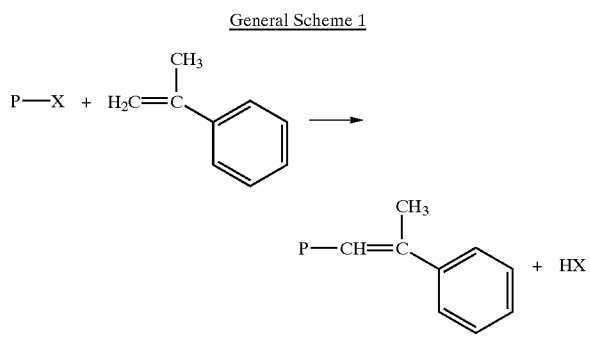

In general scheme 1, P-X represents the halogen terminated pigment dispersant.

The pigment dispersant (c) is typically present in the pigment dispersion of the present invention in an amount of at least 0.1 percent by weight, preferably at least 0.5 percent by weight, and more preferably at least 1 percent by weight, based on the total weight of the pigment dispersion. The pigment dispersant is also typically present in the pigment dispersion in an amount of less than 65 percent by weight, preferably less than 40 percent by weight, and more preferably less than 20 percent by weight, based on the total weight of the pigment dispersion. The amount of pigment dispersant (c) present in the pigment dispersion of the present invention may range between any combination of these values, inclusive of the recited values.

The pigment of the pigment dispersion of the present invention may be selected from inorganic pigments, such as carbon black pigments, e.g., furnace blacks, electrically conductive carbon black pigments, extender pigments and corrosion inhibitive pigments; organic pigments; and mixtures thereof. Examples of organic pigments that may be present in the pigment dispersion include, but are not limited to, perylenes, phthalo green, phthalo blue, nitroso pigments, manoazo pigments, diazo pigments, diazo condensation pigments, basic dye pigments, alkali blue pigments, blue lake pigments, phloxin pigments, quinacridone pigments, lake pigments of acid yellow 1 and 3, carbazole dioxazine violet pigments, alizarine lake pigments, vat pigments, phthaloxy amine pigments, carmine lake pigments, tetrachloroisoindolinone pigments and mixtures thereof. Inorganic pigments that may be present in the pigment dispersion, include, for example, titanium dioxide, electrically conductive titanium dioxide, and iron oxides, e.g., red iron oxide, yellow iron oxide, black iron oxide and transparent iron oxides. Extender pigments that may be present in the pigment dispersion include, but are not limited to, silicas, clays, and alkaline earth metal sulfates, such as calcium sulfate and barium sulfate. The pigment dispersion may contain corrosion inhibitive pigments, such as aluminum phosphate and calcium modified silica.

The pigment (a) is typically present in the pigment dispersion of the present invention in an amount of at least 0.5 percent by weight, preferably at least 5 percent by weight, and more preferably at least 20 percent by weight, based on the total weight of the pigment dispersion. The pigment is also typically present in the pigment dispersion in an amount of less than 90 percent by weight, preferably less than 80 percent by weight, and more preferably less than 75 percent by weight, based on the total weight of the pigment dispersion. The amount of pigment present in the pigment dispersion may range between any combination of these values, inclusive of the recited values.

The pigment (a) and pigment dispersant (c) are typically together present in the pigment dispersion in an amount totaling from 20 percent by weight to 80 percent by weight, e.g., from 30 percent by weight to 70 percent by weight or from 40 percent by weight to 60 percent by weight. The percent weights are based on the total combined weight of the pigment and pigment dispersant. The weight ratio of pigment (a) to pigment dispersant (c) is typically from 0.1:1 to 100:1, e.g., from 0.2:1 to 5:1 or from 0.5:1 to 2:1.

The pigment dispersion of the present invention also comprises an aqueous carrier selected from water and a mixture of water and at least one organic solvent (preferably a water soluble organic solvent). Classes of organic solvents that may be present in the aqueous carrier include, but are not limited to, alcohols, e.g., methanol, ethanol, n-propanol, iso-propanol, n-butanol, sec-butyl alcohol, tert-butyl alcohol, iso-butyl alcohol, furfuryl alcohol and tetrahydrofurfuryl alcohol; ketones or ketoalcohols, e.g., acetone, methyl ethyl ketone, and diacetone alcohol; ethers, e.g., dimethyl ether and methyl ethyl ether; cyclic ethers, e.g., tetrahydrofuran and dioxane; esters, e.g., ethyl acetate, ethyl lactate, ethylene carbonate and propylene carbonate; polyhydric alcohols, e.g., ethylene glycol, diethylene glycol, triethylene glycol, propylene glycol, tetraethylene glycol, polyethylene glycol, glycerol, 2-methyl -2,4-pentanediol and 1,2,6-hexantriol; hydroxy functional ethers of alkylene glycols, e.g., butyl 2-hydroxyethyl ether, hexyl 2-hydroxyethyl ether, methyl 2-hydroxypropyl ether and phenyl 2-hydroxypropyl ether; nitrogen containing cyclic compounds, e.g., pyrrolidone, N-methyl-2-pyrrolidone and 1,3-dimethyl-2-imidazolidinone; and sulfur containing compounds such as thioglycol, dimethyl sulfoxide and tetramethylene sulfone.

When the aqueous carrier comprises a mixture of water and organic solvent, the aqueous carrier typically contains from 30 to 95 percent by weight of water, and from 5 to 70 percent by weight of organic solvent, e.g., from 60 to 95 percent by weight of water, and from 5 to 40 percent by weight of organic solvent. The percent weights are based on the total weight of the aqueous carrier.

The aqueous carrier (b) is typically present in the pigment dispersion of the present invention, in an amount of at least 5 percent by weight, preferably at least 15 percent by weight, and more preferably at least 30 percent by weight, based on the total weight of the pigment dispersion. The aqueous carrier is also typically present in the pigment dispersion in an amount of less,than 99.4 percent by weight, preferably less than 80 percent by weight, and more preferably less than 60 percent by weight, based on the total weight of the pigment dispersion. The amount of aqueous carrier present in the pigment dispersion may range between any combination of these values, inclusive of the recited values.

The pigment dispersion may be prepared by methods that are known to those of ordinary skill in the art. Such known methods typically involve the use of energy intensive mixing or grinding means, such as ball mills or media mills (e.g., sand mills), as described previously herein.

The pigment dispersion of the present invention is useful in the preparation of, for example, coatings compositions and inks. To form a pigmented coating composition, the pigment dispersion is typically mixed together with resins, crosslinkers, additives, such as flow control agents, and additional solvents. Coating compositions into which the pigment dispersion of the present invention may be incorporated include, for example, liquid spray-, dip- and curtain-applied primer, basecoat (i.e., the basecoat in a color-plus-clear basecoat/clearcoat system) and topcoat compositions, and electrodepositable coating compositions.

The present invention is more particularly described in the following examples, which are intended to be illustrative only, since numerous modifications and variations therein will be apparent to those skilled in the art. Unless otherwise specified, all parts and percentages are by weight.

SYNTHESIS EXAMPLE A AND B

Synthesis Examples A and B describe the preparation of two pigment dispersants that are used to prepare pigment dispersions according to the present invention as described in the pigment dispersion Examples.

Example A

A pigment dispersant was prepared by controlled radical polymerization from the ingredients as enumerated in the following Table A.

TABLE A

| Ingredients | Parts by weight |
|---|---|
| Charge 1 | |
| toluene | 75 |
| Charge 2 | |
| 1-napthalenesulfonyl chloride | 12.5 |
| copper powder (a) | 3.5 |
| 2,2'-bipyridyl | 8.6 |
| Charge 3 | |
| glycidyl methacrylate | 53 |
| Charge 4 | |
| MPEG 550 MA monomer (b) | 453 |
| methyl 2-hydroxypropyl ether solvent | 175 |
| Charge 5 | |
| magnesium silicate (c) | 50 |
| methyl 2-hydroxypropyl ether solvent | 200 |
| Charge 6 | |
| Deionized water | 600 |
| Charge 7 | |
| Dimethylethanolamine | 1.1 |

(a) The copper powder had an average particle size of 25 microns, a density of 1 gram/cm$^3$, and was obtained commercially from OMG Americas.
(b) MPEG 550 MA monomer is a methoxy poly(ethylene glycol) methacrylate monomer from Sartomer Company, Inc.
(c) MAGNESOL synthetic magnesium silicate obtained commercially from The Dallas Group of America.

Charge 1 was sparged with nitrogen for 30 minutes and added to a 2 liter 4-necked flask equipped with a motor driven stainless steel stir blade, water cooled condenser, and a heating mantle and thermometer connected through a temperature feed-back control device. A dry nitrogen sweep was passed through the flask throughout the course of the polymerization. Charge 2 was added to the flask, and the contents of the flask were heated to and held at 70° C. for 30 minutes. Charge 3 was added to the flask at 70° C. over a period of 30 minutes and the reaction was stirred for 6 hours at 80° C. Charge 4 was then added over 30 minutes, and the reaction was stirred for 4 hours at 80° C. Charge 5 was added and the mixture was stirred at 70° C. for two hours. The contents of the flask were passed through a filter-press packed with MAGNESOL synthetic magnesium silicate. The filtered resin was then concentrated to 70 percent weight solids, based on total weight by vacuum stripping. The resin was heated to 70° C. and charge 6 was added. The pH of the solution was adjusted to approximately 8 with charge 7.

The pigment dispersant of Example A was found to have: Mn=7965; Mw=10,483; z average molecular weight (Mz)=14,725; and a polydispersity index (PDI) (i.e., Mw/Mn)=1.32.

Example B

A pigment dispersant was prepared by controlled radical polymerization from the ingredients as enumerated in the following Table B.

TABLE B

| Ingredients | Parts by weight |
|---|---|
| Charge 1 | |
| Dowanol PM | 250 |
| Charge 2 | |
| 1-napthalenesulfonyl chloride | 12.7 |
| copper powder (a) | 3.6 |
| 2,2'-bipyridyl | 8.8 |
| Charge 3 | |
| MPEG 550 MA monomer (b) | 499 |
| Charge 4 | |
| magnesium silicate (c) | 30 |
| methyl 2-hydroxypropyl ether solvent | 200 |
| Charge 5 | |
| Deionized water | 410 |
| Charge 6 | |
| Dimethylethanolamine | 5.4 |

Charge 1 was sparged with nitrogen for 30 minutes and added to a 2 liter 4-necked flask equipped as described in Example A. A dry nitrogen sweep was passed through the flask throughout the course of the polymerization. Charge 2 was then added to the flask, and the contents of the flask were heated to and held at 70° C. for 30 minutes. Charge 3 was added to the flask at 80° C. over a period of 30 minutes and the reaction was stirred for 10 hours at 80° C. Charge 4 was added and the mixture was stirred at 70° C. for two hours. The contents of the flask were passed through a filter-press packed with MAGNESOL synthetic magnesium silicate. The filtered resin was then concentrated to 70 percent weight solids, based on total weight, by vacuum stripping. The resin was heated to 70° C. and charge 5 was added. The pH of the solution was adjusted to approximately 8 with charge 6.

The pigment dispersant of Example B was found to have: Mn=21,055; Mw=30,317; z average molecular weight (Mz)=39,404; and a polydispersity index (PDI) (i.e., Mw/Mn)=1.44.

Pigment Dispersion Examples 1 and 2

Pigment dispersions according to the present invention, were prepared using the ingredients listed in Table 1. Physical properties of the pigment dispersions are listed in Table 2.

TABLE 1

| | Pigment Dispersions | |
|---|---|---|
| Ingredients | Pigment Dispersion 1 | Pigment Dispersion 2 |
| pigment dispersant of Example A | 205 | 0 |
| pigment dispersant of Example B | 0 | 212 |
| defoamer (d) | 2.2 | 2.9 |
| deionized water | 3 | 64 |

TABLE 1-continued

Pigment Dispersions

| Ingredients | Pigment Dispersion 1 | Pigment Dispersion 2 |
| --- | --- | --- |
| chlorinated copper phthalocyanine blue pigment (e) | 35 | 45 |
| aqueous DMEA (f) | 0.4 | 2.6 |

(d) BYK 031 defoamer from Byk-Chemie.
(e) B-4816 Palomar Blue chlorinated copper phthalocyanine blue pigment obtained from Bayer.
(f) 50 percent by weight dimethylethanolamine (DMEA) in deionized water.

Pigment dispersions 1 and 2 were each prepared according to the following method. Pigment dispersant, defoamer and deionized water were mixed in a stainless steal beaker using a cowles blade for approximately 10 minutes. The chlorinated copper phthalocyanine blue pigment was added to the stainless steal beaker with agitation from the cowles blade. The pH of the contents of the stainless steal beaker was adjusted to a value of 9 by addition of the aqueous dimethylethanolamine, followed by 15 minutes of additional mixing with the cowles blade to form a pre-paste. The pre-paste was then transferred to and ground in an Eiger Mini Motormill 100 (from Eiger Machine, Inc. of Chicago, Ill). During the grinding process, the temperature of the contents of mill did not rise above 30° C. The pigment dispersion was removed from the mill and transferred to a suitable container.

TABLE 2

Physical Properties of Pigment Dispersions 1 and 2

| | Pigment Dispersion 1 | Pigment Dispersion 2 |
| --- | --- | --- |
| Percent Solids (g) | 43 | 42 |
| Pigment to Pigment Dispersant Ratio (h) | 0.5 | 0.5 |
| Haze Value (%) (i) | 14.5 | 18.4 |
| Mean Particle Size (microns) (j) | 1.073 | 1.347 |

(g) Percent solids by weight, based on the total weight of the pigment dispersion.
(h) The weight of dry pigment divided by the solids weight of pigment dispersant.
(i) Haze values were determined using a TCS Plus Spectrophotometer Model 8870 from Byk-Gardner.
(j) Particle size was determined using a Coulter LS 230 Particle Size Analyzer from Beckman Coulter Corporation.

Mean particle sizes of less than 2 microns and haze values of less than 25 percent are considered generally to be desirable for aqueous pigment dispersions of chlorinated copper phthalocyanine blue pigment having a pigment to pigment dispersant weight ratio of 0.5, and a solids content of approximately 43 percent by weight, based on total weight.

The present invention has been described with reference to specific details of particular embodiments thereof. It is not intended that such details be regarded as limitations upon the scope of the invention except insofar as and to the extent that they are included in the accompanying claims.

We claim:

1. A composition comprising
   a) 1 to 99.9% by weight of a block copolymer of the formula:

$$\phi\text{-}(G)_p\text{-}(E)_s\text{-}T \qquad (I)$$

wherein:
   φ represents a polymerization initiator fragment of a polymerization initiator capable of initiating atomic transfer radical polymerization (ATRP) of ethylenically unsaturated monomers in the presence of a catalyst capable of activating controlled radical polymerization;
   G and E represent polymer blocks which differ in polarity and consist of repeating units of ethylenically unsaturated monomers;
   p and s represent numerals greater than zero and define the number of monomer repeating units in polymer blocks G and E; and
   T represents a polymer chain terminal group; and
   b) 9 to 99% by weight of a dispersible inorganic or organic pigment particles.

2. A composition according to claim 1, wherein φ represents the polymerization initiator fragment of a polymerization initiator which is selected from the group consisting of aliphatic halides, cyclo aliphatic halides, aromatic halides, $C_6$–$C_{20}$-alkyl ester of $C_2$–$C_6$ α-halo carboxylic acids and sulfonyl chlorides.

3. A composition according to claim 1, wherein the difference in polarity is obtained by copolymerizing polymer blocks G and E with different amounts of functional monomers.

4. A composition according to claim 1, wherein G and E represent polymer blocks containing repeating units of polymerizable monomers selected from the group consisting of styrenes and (meth)acrylic acid-$C_1$–$C_{20}$-alkyl esters.

5. A composition according to claim 1, wherein the polymer blocks E is more hydrophilic as compared to polymer block G and consists of higher amounts of monomers carrying functional groups and wherein the monomers are selected from the group consisting of (meth)acrylic acid and salts thereof, (meth) acrylic acid N-mono- or -di-$C_1$–$C_4$-alkylamino-$C_2$–$C_4$-alkyl esters and salts thereof, (meth) acrylic acid-hydroxy-$C_2$–$C_4$-alkyl esters, $C_1$–$C_4$-alkoxylated polyalkylene glycol (meth)acrylic acid esters and (meth) acrylamides.

6. A composition according to claim 1, wherein the dispersible organic pigment particles of component b) are one or more selected from the group consisting of the diazo pigment group, perylenes, monoazo pigments, diazo condensation pigments, quinacridone pigments, and mixtures thereof.

7. A composition according to claim 1, wherein the dispersible inorganic pigment particles of component b) are selected from the group consisting of iron oxide, titanium dioxide, carbon black and mixtures thereof.

8. A composition according to claim 1, which additionally contains binding agents and conventional additives.

9. A composition according to claim 1, comprising
   a) a block copolymer (I), wherein φ and T are as defined in claim 1,
   G represents a polymer block consisting of repeating units of (meth) acrylic acid-$C_1$–$C_{20}$-alkyl esters;
   E represents a polymer block consisting of repeating units of (meth) acrylic acid-$C_1$–$C_{20}$-alkyl esters which are copolymerized with monomers carrying functional groups and wherein the monomers are selected from the group consisting of (meth)acrylic acid and salts thereof, (meth)acrylic acid N-mono- or di-($C_1$–$C_4$ alkylamino) ($C_2$–$C_4$)alkyl esters and salts thereof, (meth)acrylic acid-hydroxy-$C_1$–$C_4$-alkyl esters and (meth)acrylamide;

p and s represent numerals greater than zero and define the number of monomer repeating units in G and E; and T represents a polymer chain terminal group; and b) dispersible pigment particles.

10. A pigment dispersion comprising a dispersed phase consisting of a) a block copolymer of the formula (I), wherein $\phi$, G, E, T, p and s are as defined in claim 1; and b) dispersed pigment particles;

and a liquid carrier selected from the group consisting of water and a mixture of water and organic solvents.

11. A process for preparing a composition according to claim 1, which comprises copolymerizing by atom transfer radical polymerization (ATRP) fragments G and E in the presence of polymerization initiator $\phi$-T wherein $\phi$ is as defined in claim 1, and T represents halogen and a catalytically effective amount of a catalyst capable of activating controlled atomic radical polymerization, replacing halogen T with a different polymer chain terminal group and adding dispersible pigment particles and optionally binder materials, extenders, or other conventional additives.

12. A process for preparing a pigment dispersion according to claim 11, which comprises dispersing in a liquid carrier pigment particles in the presence of a block copolymer of the formula (I), wherein $\phi$, G, E, T, p and s are as defined.

13. A method for preparing coating compositions and inks which comprises preparing a composition according to the process of claim 11.

* * * * *